No. 802,853. PATENTED OCT. 24, 1905.
H. GARNER & S. T. DAVIS.
HOSE COUPLING.
APPLICATION FILED OCT. 6, 1904.

Witnesses
P. F. Nagle.
L. Douville.

Inventors
Henry Garner.
Samuel T. Davis.
By Wiedersheim & Fairbanks
Attorneys

UNITED STATES PATENT OFFICE.

HENRY GARNER AND SAMUEL T. DAVIS, OF MEDIA, PENNSYLVANIA.

HOSE-COUPLING.

No. 802,853.  Specification of Letters Patent.  Patented Oct. 24, 1905.

Application filed October 6, 1904. Serial No. 227,440.

*To all whom it may concern:*

Be it known that we, HENRY GARNER, a subject of the King of Great Britain, having resided in the United States one year last past and declared my intention of becoming a citizen thereof, and SAMUEL T. DAVIS, a citizen of the United States, both residing at Media, county of Delaware, State of Pennsylvania, have invented a new and useful Hose-Coupling, of which the following is a specification.

Our invention consists of an improvement in hose-couplings whereby a tight joint is provided and the hose may be securely attached to the coupling members.

It further consists of novel features of construction, all as will be hereinafter set forth.

Figure 1:
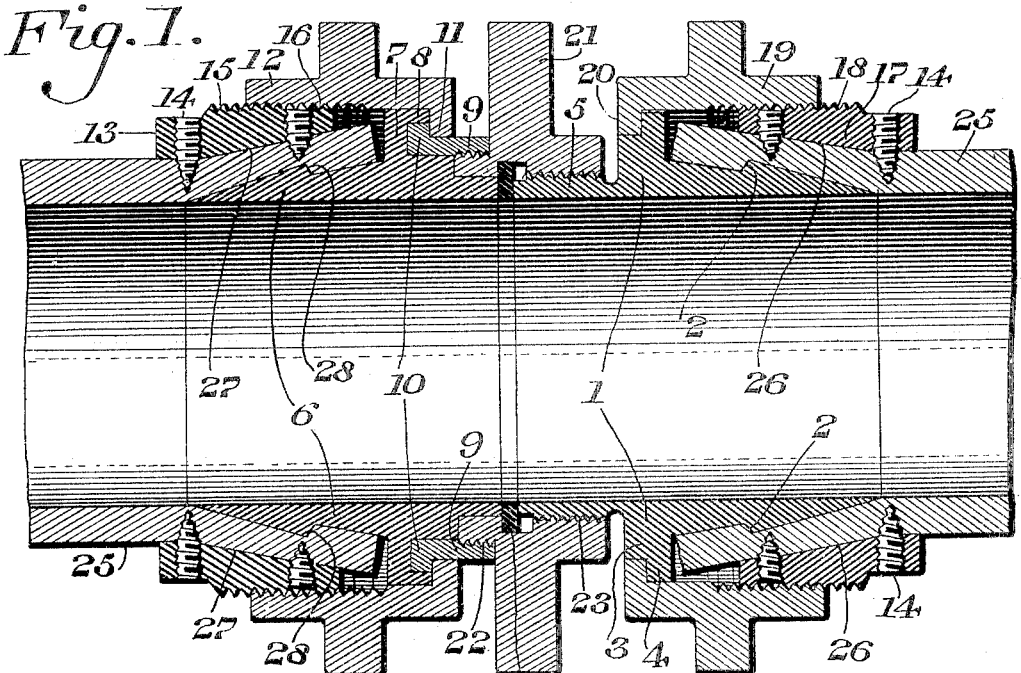
Figure 2:
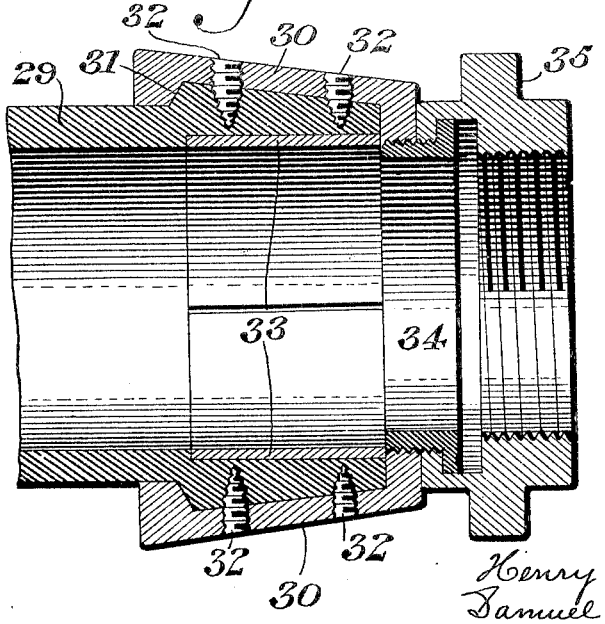

Figure 1 represents a sectional view of a coupling embodying our invention, showing the ends of the hose in position. Fig. 2 represents a sectional view in a slightly-modified form.

Similar numerals of reference indicate corresponding parts in the figures.

Referring to the drawings, 1 designates a bushing having its exterior face doubly conical, forming a shoulder 2 thereon, said bushing being provided with the extension 3, having the lug or shoulder 4 projecting therefrom. 5 designates a shell or neck projecting from said bushing which is exteriorly screw-threaded. 6 designates a bushing of the other member of the coupling, which has a circumferential lug 7 extending therefrom, which is provided with the laterally-extending lip 8.

9 designates a ring having a shoulder 10 thereon which is seated beneath the lip 8 and abuts against a flange 11, carried by a collar 12, said ring freely surrounding the adjacent portion of the bushing and freely abutting against said flange and forming a swivel therewith.

13 designates a sleeve which is provided with suitable opening in which are adapted to be seated the screws or pins 14, the exterior face of said sleeve being threaded, as at 15, and being adapted to be engaged by the thread 16 on the interior of the collar 12. 17 designates a sleeve of the other coupling member, which is likewise provided with openings for screws or pins 14 and which is screw-threaded, as at 18, to engage with threads on the inner face of a collar 19, which surrounds the bushing and which is provided with a flange 20 to engage with the lug 4 on the said bushing. The collars 12 and 19 inclose the heads of the screws 14 nearest to the end of the hose, and so prevent said screws from being drawn out by the hose when subjected to longitudinal strain.

21 designates the coupler or coupling-pin, having threads 22 thereon adapted to engage with the threads on the ring 9, so that the said ring and coupler will rotate together when the coupler is operated, thus drawing together the opposite members.

23 designates threads on the coupler which are adapted to engage with threads on the shell 5, whereby the two bushings are securely held together, a suitable washer 24 being interposed between the ends thereof.

The inner face of the sleeve 18 is inclined, as at 26, with which the flaring end of the hose 25 contacts, the inner face of the other sleeve 13 being also inclined, as at 27, while the bushing 6 is provided with the shoulder 28, similar to the shoulder 2 on the bushing 1.

The operation is as follows: The end of the hose 25 is forced around the bushing 1 with the sleeve 18 on the exterior face of said hose and secured thereto by the screws or pins 14. The collar 19 is then rotated, the screw-threads on the same and on the sleeve 18 being in engagement, so that the collar is forced toward the projection 3, and, owing to the exterior inclined face of the bushing 1 and the inclined face 26 of the sleeve 18, the end of the hose 25 is compressed therebetween and caused to be tightly held, it being noted that the shoulder 2 on the bushing 1 is forced into the rubber and assists in holding the hose in position. The same operation takes place with the other member, the end 25 of the hose being compressed between the exterior inclined face of the bushing 6 and the conical inner face 27 of the sleeve 13, said bushing 6 being also provided with the shoulder 28. It will be seen from the above that the ends of the hose will be securely held in the coupling members, which latter can be quickly and easily joined together by the coupler 21, and that an unbroken surface is presented on the interior, thus obviating any surfaces or projections that might be effected by high pressure.

In Fig. 2 we have shown a construction wherein the hose 29 is placed between the ring or sleeve 30, which has a shoulder 31 thereon and provided with openings for the reception of pins or screws 32, an expansible ring 33 being placed upon the interior of the hose and forcing the same into engagement with the shoulder 31. A ring 34 in suitable engagement with said sleeve 30 is adapted to engage with the coupler 35 in order to be connected with the other member of the coupling.

It will be evident that various changes may be made by those skilled in the art which may come within the scope of our invention, and we do not, therefore, desire to be limited in every instance to the exact construction herein shown and described.

Having thus described our invention, what we claim as new, and desire to secure by Letters Patent, is—

1. In a hose-coupling, bushings having conical exterior faces, a shoulder on each of said bushings, sleeves adapted to surround the hose, means for operating said sleeves to compress the hose between the same and the said bushings, a collar surrounding one sleeve, a collar surrounding the other sleeve, and a coupling engaging one bushing and having a ring swiveled to the collar surrounding the opposite bushing.

2. In a hose-coupling, a bushing having a double conical exterior face, a shoulder therein, a sleeve adapted to be seated exterior of said hose, a collar loosely engaging with said bushing and in suitable engagement with said sleeve for moving the latter, and a coupling-nut having a ring which is swiveled on a member of said collar.

3. In a hose-coupling, a bushing, a coupling-nut in threaded engagement with said bushing, an opposite bushing, a sleeve between which and the last-named bushing the end of the hose is clamped, an exterior collar in threaded engagement with said sleeve and freely engaging the second-named bushing, a ring connected with said nut and means forming a swiveled connection for said ring with said collar.

4. In a hose-coupling, a bushing adapted to be inserted into a hose, a sleeve adapted to be placed exterior of said hose, a collar loosely mounted on said bushing and in threaded engagement with said sleeve for operating the latter, a coupling-nut and a ring connected with said nut and having a member swiveled on a member of said collar.

5. In a hose-coupling, a bushing adapted to be inserted into a hose, a sleeve adapted to be placed exterior of said hose, a collar loosely mounted on said bushing and in threaded engagement with said sleeve for operating the latter, a coupling-nut, a ring connected with said nut and having a member swiveled on a member of said collar, and a pin adapted to pass through said sleeve into the hose and have its head covered by said collar.

6. In a hose-coupling, a bushing adapted to be inserted into a hose, a sleeve adapted to be placed exterior of said hose, a collar loosely mounted on said bushing and in threaded engagement with said sleeve for operating the latter, a coupling-nut, a ring connected with said nut and having a member swiveled to a member of said collar, an opposite bushing and hose-clamping members and a threaded neck on said bushing, said coupling-nut being in movable engagement with said neck.

7. In a hose-coupling, an interior bushing for an end portion of the hose, a sleeve on the exterior of said end between which and said end portion the end of the hose is clamped, a collar having a threaded engagement with said sleeve and a movable connection with the adjacent bushing, a bushing and a sleeve clamping the opposite end portion of the hose, a collar having a threaded engagement with said sleeve and a movable connection with the adjacent bushing, a coupling-nut having a threaded engagement with the first-named bushing, a ring connected with said nut and means forming a swiveled connection for said ring and last-named collar.

HENRY GARNER.
SAMUEL T. DAVIS.

Witnesses:
JOHN A. WIEDERSHEIM,
WM. CANER WIEDERSEIM